INVENTOR:
EDWIN A. ALLEN
By Jno. G. Elliott
ATTY.

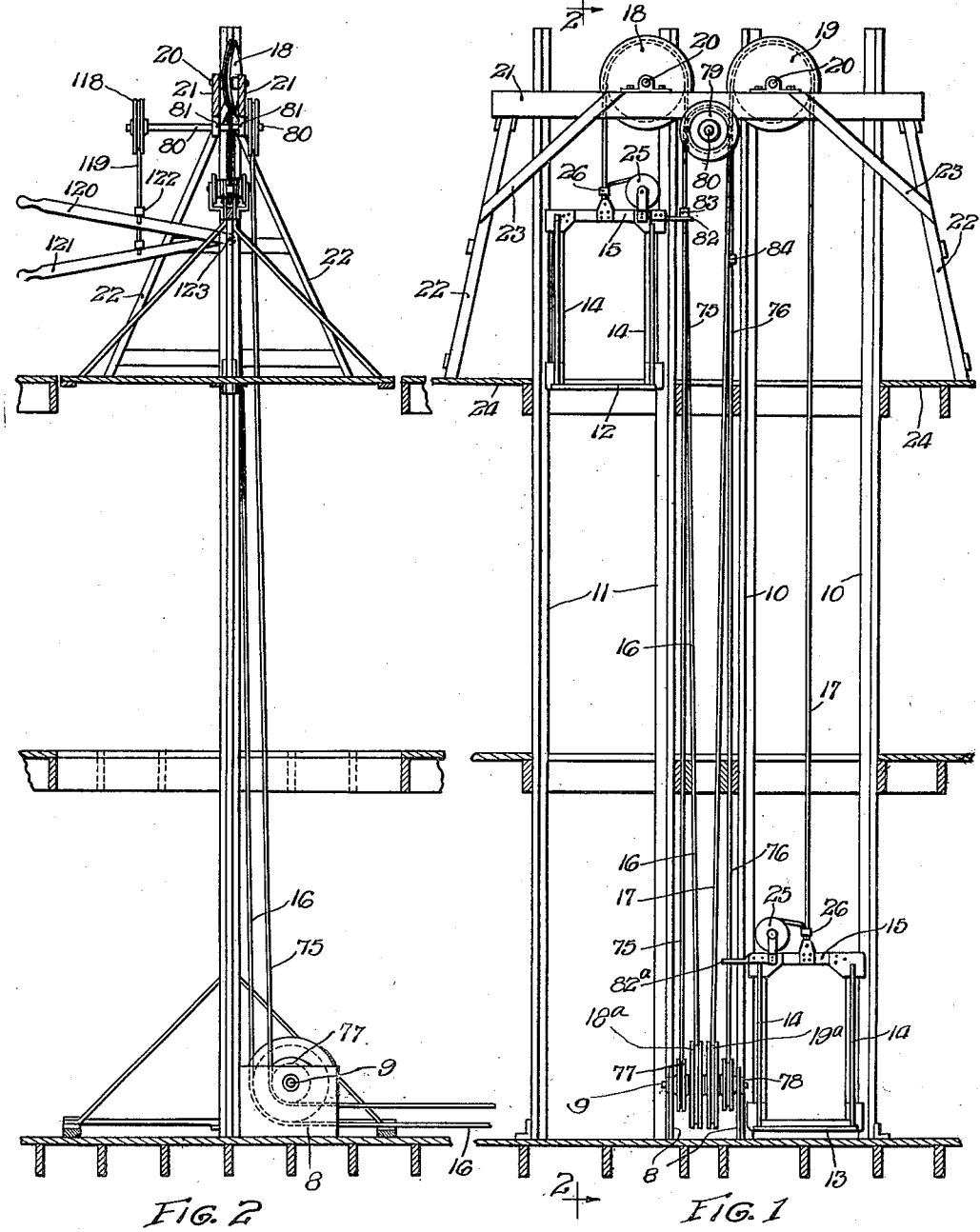

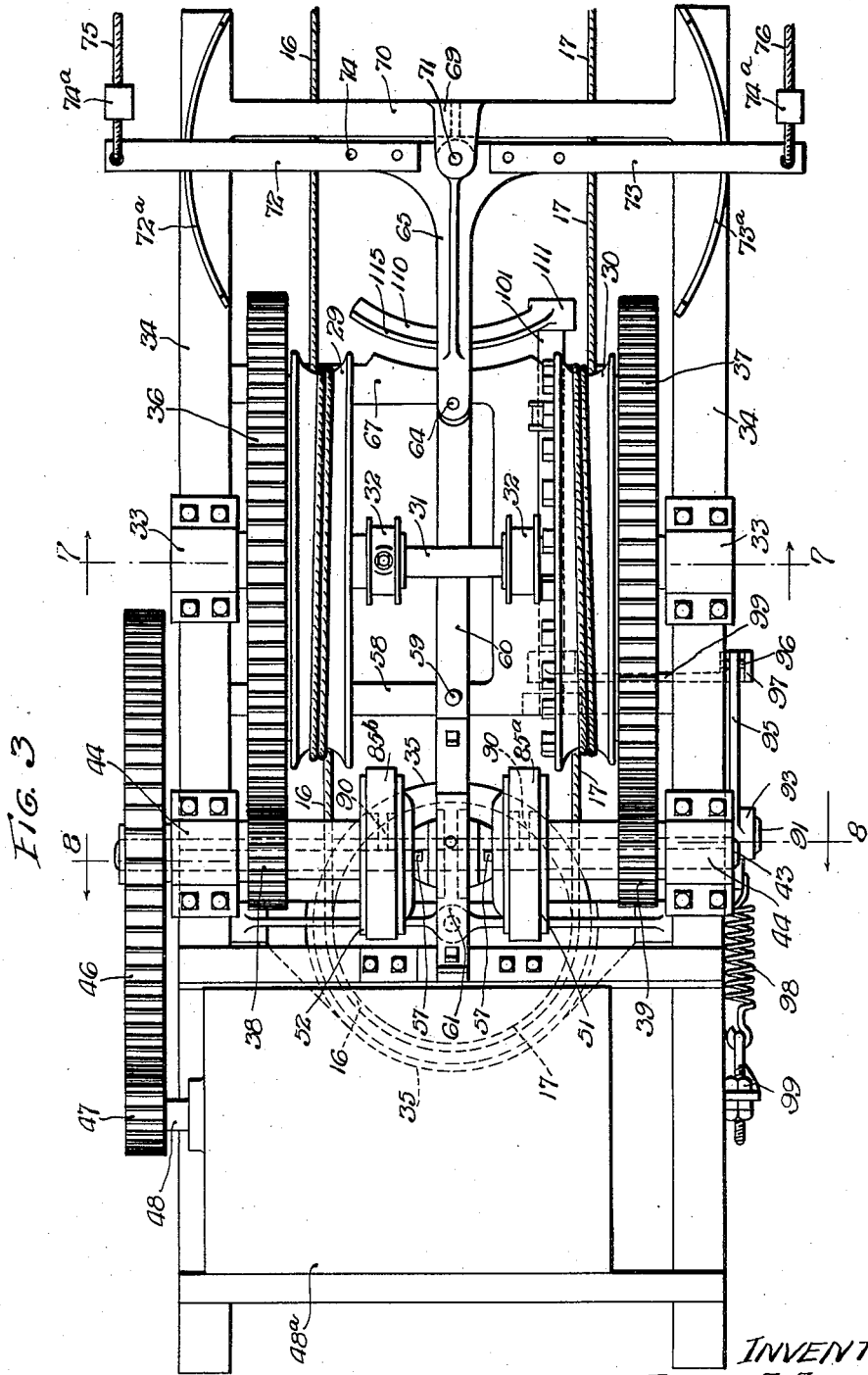

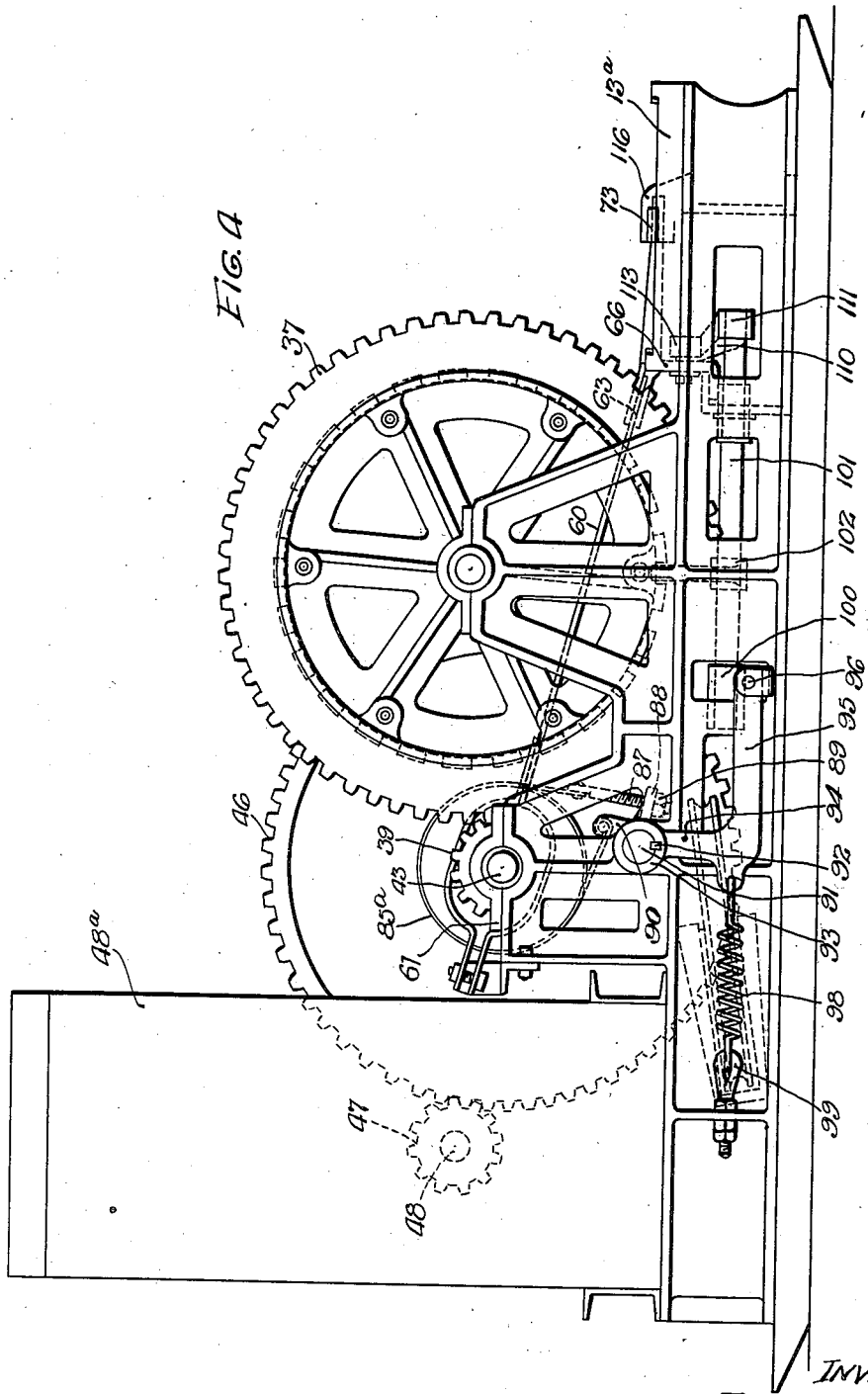

Patented June 1, 1926.

1,586,768

UNITED STATES PATENT OFFICE.

EDWIN A. ALLEN, OF CHICAGO, ILLINOIS, ASSIGNOR TO AUTOMATIC MATERIAL HOIST COMPANY, OF CHICAGO, ILLINOIS, A CORPORATION OF ILLINOIS.

TRANSPORTABLE ELEVATOR.

Application filed February 7, 1925. Serial No. 7,503.

This invention relates to improvements in transportable elevators for building materials and generally comprises a constantly running engine, two freight platforms suspended from the ends of a single cable between parallel upright tracks for each platform, a hoist, having mounted thereon a drum or drums for actuating the cable, provided with a driveshaft permanently connected with the powershaft of a continuously running engine, and having thereon a clutch adapted to connect and disconnect the driveshaft and drum shaft for operating the freight platforms, a friction brake being also provided for stopping and maintaining the loaded platform at its landing station until unloaded.

For operating the hoist clutch and the friction brake, it has heretofore been the common practice to provide the friction clutch with a hand lever and the friction brake with a foot lever located in the vicinity of the engine, under the exclusive control of an engineer employed for that purpose, who, for their timely operation, is compelled to rely upon the appropriate signals given by an attendant located at the landing station for the materials, which signals are usually transmitted by means of a bell located in the vicinity of the engineer and operated by a cord or wire within convenient reach of such attendant.

In practice, however, such means and method are subject to a number of objections, among which may be mentioned the expense attending the employment of an engineer, the not infrequent occurrence of accidents to the structure and to the attendant at the landing station, from mistakes in giving or receiving the signals; the time lost by the engineer in responding to properly given signals; the experience and skill required on the part of the engineer for so shifting the clutch that the loaded platform will not start with a jerk, and for the timely setting of the brake to accurately stop the loaded platform without first stopping before or passing beyond the landing station, and which will be understood by bearing in mind that the engineer must rely upon the pressure of his foot for controlling the friction brake, which pressure, at best, is more or less difficult to control.

From the foregoing, it will now be apparent that any means adapted for dispensing with the services of an engineer and the use of signals for operating transportable elevators for building materials, and by which it is practicable and possible for the attendant at the landing station to exclusively control the clutch and friction brake for operating the platforms will be a substantial and material improvement in the art, both from the standpoint of economy and safety.

The prime object of my invention broadly stated, is to provide a transportable elevator for hoisting building materials with means by which the operation of the friction clutch and the friction brake on the hoist are exclusively controlled and operated by an attendant located at the unloading station for the elevated materials.

Another object of my invention is to provide such an elevator with means adapted for automatically setting the brake and concurrently therewith positively locking the loaded platform at its unloading station; in other words, to provide a positive lock supplementing the friction brake for maintaining the loaded elevator at its loading station until unloaded.

A further object of my invention is to provide two hand levers within convenient reach of the attendant at the unloading station, so connected with the clutch and friction brake of the hoist and with each other that when one of said levers is actuated for disconnecting the positive lock and releasing the friction brake for the elevated platform, the other lever will be concurrently therewith automatically moved to a position actuating the clutch and setting the brake for the other platform.

With these ends in view, my invention finds embodiment in certain features of novelty in the construction, combination and arrangement of parts by which the said objects and certain other objects are attained, all as hereinafter fully described with reference to the accompanying drawings and more fully pointed out in the claims.

In said drawings,—

Fig. 1 is a front elevation of the freight platforms, the trackway, and the actuating cables therefor, in which my invention finds embodiment.

Fig. 2 is a side elevation thereof.

Fig. 3 is a top plan view of the hoisting mechanism.

Fig. 4 is a side elevation thereof.

Similar characters of reference indicate the same parts in the several figures of the drawings.

Figure 5:
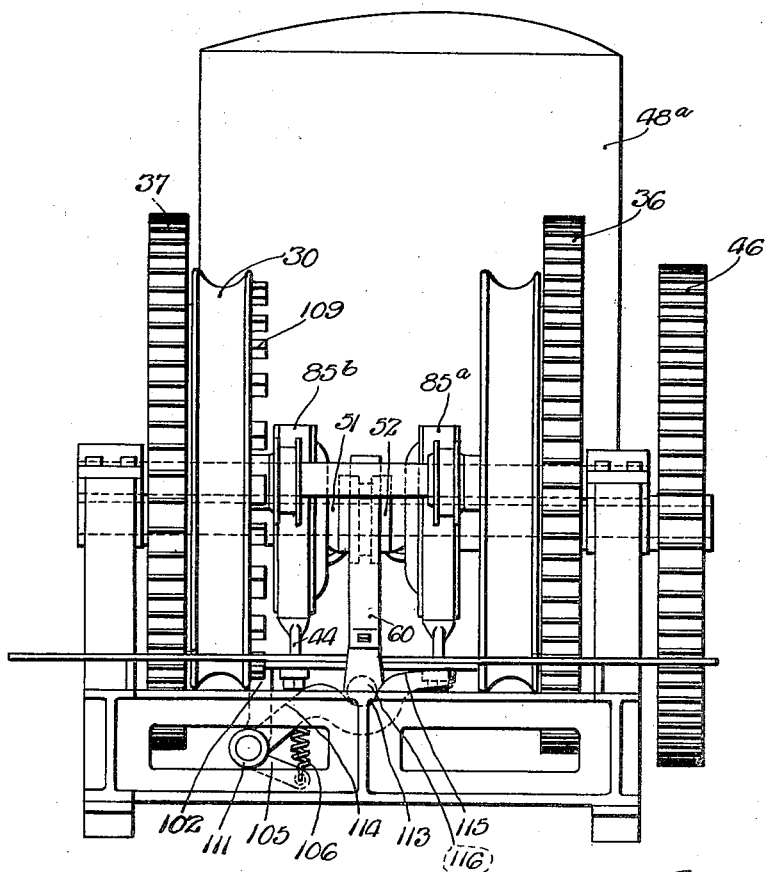
Fig. 5 is an end elevation.

Referring to Figure 3 which shows the hoisting machine proper, it will be noted that it comprises a suitable frame upon which a horizontal drum 35 is journalled. A one piece cable is wound intermediate its ends upon this drum, and the branches or end portions 16 and 17 of this cable extend from the pulley 35 and are respectively wrapped for a few turns around the drums 29 and 30 loosely sleeved upon a shaft 31 journalled in suitable bearings 33 upon the side members 34 of the machine, each being confined between its bearing and a collar 32. The portion 16 of the cable extends from its drum 29 to a pulley 18ª (Figure 1) journalled upon a shaft 9 supported in brackets 8 at the foot of the hoisting tower which is usually a short distance removed from the hoisting machine. From the pulley 18ª the portions 16 of the cable is trained over a pulley 18 upon a shaft 20 journalled upon a vertically adjustable support 21 at the top of the hoisting tower. The cable 16 depends from the pulley 18 and supports an elevator or platform 12 which consists of a bottom and side members 14 which are grooved to fit the vertical guide standards 11 which form the hoisting tower. A cross bar 15 connects the tops of the side members. The cable portion 16 is suitably anchored to the cross bar 15 and then led around a cable storage pulley 25 supported upon the cross bar.

The branch or portion 17 of the cable leads from the drum 30 of the hoisting machine to a pulley 19ª journalled upon the shaft 9. The portions 17 is trained over the pulley 19ª and then over a pulley 19 on a shaft 20 journalled upon the adjustable support 21. The cable portion 17 depends from the pulley 19 and is attached to the cross bar 15 of a second elevator or platform 13 similar to the one above described and that is guided in its movements by the vertical guides 10. A cable storage pulley 25 is also supported upon the cross bar 15 of this elevator, around which the end of the cable may be wound. This will allow lengthening of the cable when the tower is made higher.

The adjustable support 21 is supported upon legs 22 resting upon a platform 24 which may be provided. Suitable diagonal braces 23 connect the legs with the support 21 to strengthen the same. It is of course understood that these hoisting towers may be raised or lowered by being made in sections to suit the particular height to which material is to be elevated.

From the foregoing it will be apparent that as one platform is ascending, the other will be descending.

Figure 7:
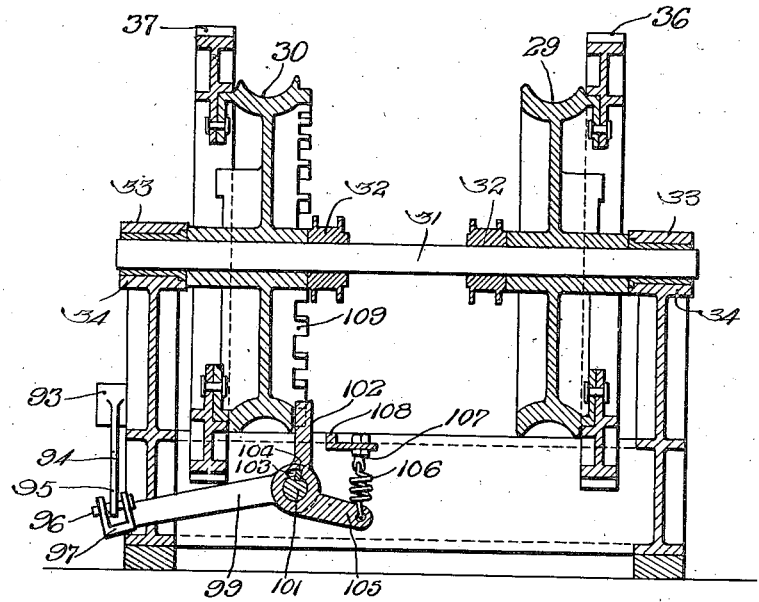
Fig. 7 is a detailed vertical section taken on the line 7—7 of Fig. 3.

Referring now more particularly to Figures 3 and 7, it will be noted that a gear 36 is secured upon the drum 29 and a gear 37 is secured upon the drum 30. The gear 36 meshes with a pinion 38 keyed by a key 40 upon a sleeve 41 loosely mounted upon a shaft 43 and provided with a clutch housing 54. The gear 37 meshes with a pinion 39 keyed by a key 40 upon a sleeve 42 loosely mounted upon the aforesaid shaft 43 and provided with a clutch housing 54. The ends of the shaft 43 are journalled in bearing 44 upon the side members 34 of the frame. The shaft 43 projects beyond one bearing for supporting a large gear 46 keyed thereon by a key 45. The gear 46 meshes with a pinion 47 on an engine shaft 48 of a continuously running engine 48ª which is preferably a gasolene engine but may be otherwise.

During the operation of the hoist, the shaft 43 is continuously rotated through the instrumentality of the gear 46; the sleeves 41 and 42, with their pinions 38 and 39 will, however, not be effective to transmit power to the drums 29 and 30 until clutched to the shaft. For this purpose suitable clutching mechanism has been provided for cooperation with the housings 54 whereby the sleeves 41 and 42 may be alternately clutched to the shaft.

While any common and well known clutching mechanism may be used, I have illustrated a form which is preferable for hoisting machines of this type. This mechanism consists of a pair of clutch members 53 keyed upon the shaft 43, one within each clutch housing 54. On the inner side, these clutch members 53 are bevelled for co-action with suitable wedge rings 53ª which have flat peripheries that frictionally engage the horizontal flanges 85 of the housing. A slidable clutch member 55 having an inner bevelled periphery coacts with each wedge ring in opposed relation to the member 53. It will be noted that each wedge ring 53ª is triangular in cross section, the base of which engages the interior surface of the housing 54, while the sides are engaged by the members 53 and 55.

Means are provided for alternately urging the members 55 against the wedge rings to provide a friction drive through the parts 53—53ᵃ and 54. In the present instance, this means consists of two sets of dogs 57; each set being pivoted upon a ring 55ᵃ secured upon the hub of the clutch member 55. The free ends of the dogs are adapted to be engaged by cone faces 50 that project from the sides of a neutral member 49 slidably keyed upon the shaft 43 but rotatable therewith.

Figure 8:
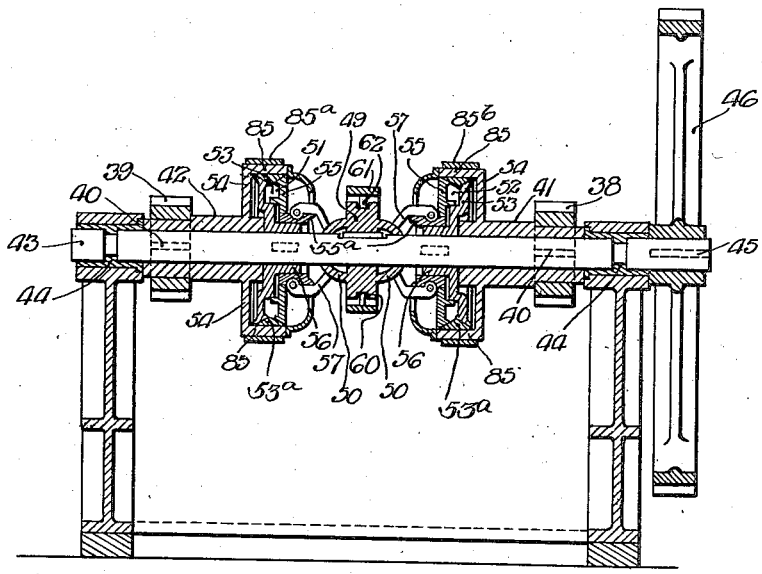
Fig. 8 is a section taken on the line 8—8 of Fig. 3.

When the member 49 is shifted to the right as viewed in Figure 8, the right hand pinion 38 will be clutched to the shaft, and when the member 49 is shifted to the left, the pinion 39 will be clutched to the shaft. During each movement the proper dogs 57 will be elevated and forced against the rings 55.

Supported by a crossbar 58 of the frame of the machine (see Fig. 3) and secured thereto by a pivot 59, is a lever 60, which terminates at one end in a yoke 61, which (see Figs. 3, 4 and 8) is provided with diametrically opposite pins 62, projecting into a circumferential groove in the periphery of the neutral clutch member 49, which groove serves to connect the lever 60 with the neutral clutch member and prevent the lateral movement of either with reference to each other.

When the lever 60 is in the position indicated in Fig. 8 and shown in Figs. 3 and 5, that is to say, extending at a right-angle to the axis of the several clutch members, the neutral member of the clutch will be out of operative engagement with both clutch members and so positioned that it may be moved to operative engagement alternately with the clutch members by accordingly shifting the lever 60 on its fulcrum pivot 59.

One of the objects of my invention is to provide a transportable elevator for building materials with means by which the operation of the friction clutch upon the driveshaft of the hoist is automatically controlled by the movement of the elevator platforms.

To these ends, the other end of the lever 60 (see Fig. 6) projects between parallel lugs 63, 63, and is secured thereto by a pivot 64, which lugs project from the stem 65 of a T-shaped lever, from the end of which also depends an angular bracket 66, which, together with the opposing lug 63, straddles a crossbar 67 on the frame of the machine and thereby prevents an undue vertical movement of both levers.

The T-shaped lever is provided (see Fig. 6) with a hub 68, and is pivotally connected with a bracket 69, secured to a crossbar 70 of the machine by means of a bolt 71, passing through the bracket and through the hub 67.

Figure 6:
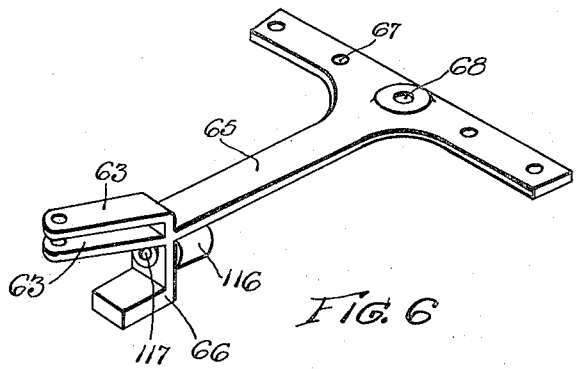
Fig. 6 is a detailed perspective view of the lever connection between the clutch mechanism of the hoist and the automatic stop for the freight platforms.

The crossbar of the T-shaped lever, as shown in Fig. 6, is (see Fig. 3) lengthened by means of bars 72, 73, bolted or riveted thereto, as indicated at 74, the free ends of which lengthening bars 72, 73, project outwardly beyond the sides of the frame, and are supported upon trackways 72ᵃ and 73ᵃ.

Secured to the ends of the bars 72, 73, by suitable means indicated at 74ᵃ, 74ᵃ, are the ends 75, 76, of a one-piece wire or control cable, respectively directed to pulleys 77 and 78 on the shaft 9, as previously described and shown in Fig. 1, and whence the cable is directed upwardly to and over a pulley 79, the shaft 80 of which (see Fig. 2) has its bearings in brackets 81, 81, depending from the parallel bars of the bench support for the pulleys 18 and 19.

The elevator platforms 12 and 13 are respectively provided with arms 82 and 82ᵃ, secured to their crossbars 15, which project in the path of movement of the end portions 75 and 76 of the control cable, passing around the pulley 79 and depending therefrom, said end portions being provided a comparatively short distance below the pulley 79, respectively with stops 83 and 84, fixed thereon, and adapted to be engaged alternately by the arms 82 and 82ᵃ of the elevator platforms 12 and 13.

Connected, as are the end portions 75 and 76 with the ends of the arms 72, 73 of the T-shaped lever 65, said arms and stops provide a means utilizing the freight platforms 12 and 13 for shifting the clutch member 49 from neutral to alternate engagement with the clutch members 51 and 52.

In other words, when the loaded platform 12 is at its landing station and the platform 13 at its loading station, as shown in Fig. 1, the clutch 49 is in neutral, that is to say, disconnected from both friction clutch members 51 and 52, the platform 12 being thus positioned until the friction brake and positive locking device, hereinafter described, are released from their holding and locking positions, concurrently with the shifting of the neutral member to engagement with the friction clutch 52, for directing the power of the engine to and for lifting the then loaded platform 13, while in the meantime the platform 12 is descending by gravity to its loading position.

Another and important feature of my invention is to provide a positive lock for an elevator platform at its landing station, adapted to cooperate with the usual friction brake for stopping and frictionally holding an elevator platform at its station, the operation of which brake and lock is simultaneous and controllable by the attendant at the elevated unloading station for the elevator platforms.

Referring to Figures 4, 5 and 8, it will be seen that brake bands 85ᵃ and 85ᵇ respectively, embrace the flanges 85 of the housings 54. One end of each brake band is secured to a bolt 87 (Figure 4) which is adjustably anchored by a nut 89 in a fixed lug 88. The other ends of the brake bands are secured respectively to spaced arms 90 rigidly projecting from a shaft 91.

Splined to one end of the shaft 91 (see Fig. 4), as indicated at 92, is a hub 93, to which is secured the end of one arm 94 of an angular lever, the other arm 95 of which is attached by an elongated pivot 96, extending across a U-shaped support 97.

A coiled spring 98, provided with an adjusting device 99, operates to actuate the angular lever to a position for normally maintaining the friction clutch bands 85ᵃ and 85ᵇ taut upon the opposing member of the friction brake, and to normally maintain the U-shaped support 97 in its depressed position.

The U-shaped pivotal support 97 for the arm 95 (see Fig. 7) is secured to one end of an arm 99, provided with a hub 100 (see Fig. 4) fixed upon an oscillating shaft 101, extending at a right-angle to the shaft 91.

Mounted upon the oscillating shaft 101 (see Figs. 4 and 7) is a pawl 102, provided with a cutaway portion 103 and secured to the shaft 101 by a key 104, from which pawl projects an arm 105, to the end of which is connected one end of a coiled spring 106, the other end of which is provided with an adjusting device 107, attached to a fixed bar 108 of the frame of the machine, for normally maintaining the pawl in its locked position.

Pawl 102 is adapted to be engaged with and disengaged from a circular rack 109, secured to or formed with the rim of the drum 30, which pawl and rack provide for positively locking the elevator platforms at their landing station, concurrently with the stopping of the elevator by the friction brake heretofore relied upon for maintaining a loaded platform at its landing station.

For simultaneously actuating the friction brake and the positive locking device, a curved arm 110 is secured to the oscillating shaft 101 by means of a hub 111, which arm projects beneath and across the path of movement of the stem 65 of the T-shaped lever and is provided, about the center of its length, with a curved depression 113, merging into straight surfaces 114 and 115, providing straight trackways for a roller 116, mounted upon a pin 117, secured to the vertical member of the angular bracket 66, depending from the stem 65 of the T-shaped lever 65.

When the roller 116 is located at the bottom of the depression 113, the curved arm 110 is at the limit of its upward movement, the friction brake set, the pawl 102 locked to the circular rack 109 against the resistance of the spring 106, the friction clutch in neutral, the lever 60 and the stem of the T-shaped lever in alinement, and the crossbar of the lever in a line parallel with the driveshaft 43 of the hoist, the elevator 12 will be located at its landing station, all as shown in the several figures of the drawings.

If, while in these positions, the pulley 79 now be actuated to pull on the end portion 75 of the cable suspended from the pulley, the stem of the T-shaped lever 65 will be swung towards the free end of the curved arm 110, with the result that the roller will be forced out of the depression 116 to engagement with the straight surface 115 of the curved arm, and thereby depress the lever and actuate the shaft 111, to release the friction brakes from the driveshaft 43, while in the meantime the lever 60 actuated as it is, by the T-shaped lever, will have shifted the friction clutch from neutral to engagement with the friction member 51.

With the shifting of the friction clutch from neutral to engagement with the friction clutch member 52, the force of the constantly running engine is directed and applied to the drum 30, for starting and lifting the then loaded elevator platform 13 to its unloading station, while in the meantime the elevator 12 is descending to and arrives at its loading station concurrently with the arrival of the elevator 13 at its unloading station.

With the rising of the elevator 13, the engagement of its arm 82ᵃ with and lifting the stop 84 opposed thereto results in returning the clutch 53 to neutral, as before described in connection with the elevator platform 12, the resetting of the friction brakes by spring 98, and the reengagement of the pawl 102 with the circular rack 109.

From the foregoing it will now be apparent that for the operation of the friction clutch, the pulley 79 is actuated by the cable suspended therefrom, and that for operating the friction brake and locking device, in conformity with my invention, the pulley 79 must be positively actuated by means conveniently accessible to and controlled by the attendant at the unloading station for the materials elevated by the platforms.

To these ends, a pulley 118 is secured to the end of the shaft 80, from which pulley is suspended a short strap or cord 119, adapted to actuate the pulley, the depending ends of which strap or cord are secured respectively to levers 120 and 121 by any suitable means such as are indicated at 122, which levers have a common fulcrum, provided by a pintle 123, supported by one of the uprights for the trackways of the elevator platform and operating as now to be described.

When the elevator platform 12 in Fig. 1 and the hand levers 119—120 are in the position shown in Fig. 2, the friction clutches 51 and 52 are in neutral, the friction brake is set, the platform 12 is positively locked and the roller 116 (see Fig. 5) is located at the bottom of the curved depression 113, in which positions the lever 120 is at the limit of its upward movement and the lever 121 at the limit of its upward movement.

If, however, while the several devices enumerated occupy the positions above described, the positions of the hand levers 120 and 121 are then reversed by pressing downwardly upon the hand lever 120, the oscillating shaft (see Figs. 4 and 5) will be actuated to release the friction brakes and disengage the pawl 102 from the circular rack 109, and they will both so remain until the then positions of the two levers are reversed for stopping and locking the elevator platform 13 at its landing station, concurrently with the descent of the elevator 12 by gravity to its loading position before occupied by the elevator platform 13.

In other words, with the depression of the lever 120, the pulleys 118 and 79 are rotated upon their axes until the end portions 75 and 76 are respectively shortened and lengthened, and the crossbar of the T-lever is swung sufficiently to simultaneously release the brake and disconnect the pawl and rack and concurrently therewith move the lever the distance necessary for shifting the neutral member of the clutch to engagement with the clutch member 51 and thereby transmitting the power of the constantly running engine to the drum 30, operating the cable end portion 17, from the free end of which the elevator platform 13 is suspended.

It will now be clearly apparent that my invention not only provides a means by which a friction clutch, mounted upon the continuously revolving driveshaft of the hoist for an elevator, may be and is successfully automatically operated, and with certainty, at the proper time, by the movement of concurrently ascending and descending elevator platforms, but for the absolute control of the friction brake by an attendant at the unloading station for elevator platforms; that it provides a means by which the operation of the friction brake for an elevator structure is absolutely directly controlled by an attendant at the unloading station for both of the elevator platforms; and that my invention, for the first time, provides a means for positively locking an elevator platform at its landing station, regardless of the friction brake, heretofore exclusively used for that purpose, notwithstanding that the operation of a friction brake is not wholly reliable for that purpose.

While I have shown and described in detail, specifically, the devices and arrangement of the devices in which my invention finds embodiment, it is to be understood that my invention includes the use of any common, well-known construction of friction clutch other than is shown in Fig. 8, which is adapted for substantially the same purpose, and any form of locking device other than that shown in Fig. 7, and the connections between such locking device and the friction brake, adaptable for their respective purposes.

In other words, broadly considered, my invention includes any means by which elevator platforms, suspended from the end of a single cable, are adapted for automatically shifting the friction clutch on the driveshaft for the elevator platforms to and from neutral to alternately operative engagement with its friction members, and also any means by which the operation of the friction brake for the platforms is controllable and controlled by an attendant located at the unloading station for the platforms, and concurrently with the automatic shifting of the friction clutch from its operative position to neutral.

My invention further broadly includes any means for positively locking the elevator platforms at their unloading station, which is adapted to be operated by the attendant at such station concurrently with the setting of the friction brake, and which is also releasable with the unsetting of said brake.

In short, while I have illustrated and described the preferred form and construction of devices for carrying my invention into effect, it is nevertheless capable of variations and modifications, without departing from the spirit of my invention, and I therefore do not wish to be limited to the precise details of the construction set forth, but desire to avail myself of such variations and modifications as come within the scope of the appended claims.

Having described my invention, what I claim and desire to secure by Letters Patent is:

1. The combination with elevator platforms, the suspensory therefor, drums for actuating the suspensory to alternately raise and lower the platforms, a driveshaft for operating said drums, a friction brake for each of the platforms, an oscillating shaft connected with the friction brake, in turn connected with and adapted to be operated by a shaft and lever connection, a cable for actuating said levers and shafts, a pulley located above the limit of the upward movement of the elevator platforms suspending said cable, and means located at the landing station for the platforms adapted to actuate the pulley for operating the cable, adapted to be manually controlled by the operator at said landing station.

2. The combination with elevator platforms, the suspensory therefor, drums for operating said suspensory, a friction brake for each platform mounted upon the driveshaft, an oscillating shaft for operating said brakes, of a positive lock for the drums connected with the oscillating shaft, and manually operating means located at the unloading station for the platforms adapted for simultaneously setting and unsetting the friction brake and engaging and disengaging the locking device.

3. The combination with elevator platforms, a suspensory cable therefor, drums for actuating said cable for alternately raising and lowering said platforms, a continuously revolving driveshaft for operating said drum, of a friction brake for each of said drums mounted upon the driveshaft, a positive locking device for the drums, another oscillating shaft extending at a right-angle to said first-mentioned oscillating shaft, levers connecting said shafts, an arm projecting from said last-named oscillating shafts, a T-shaped lever supported by and adapted to actuate said arm for simultaneously stopping the movement of and locking a loaded platform at its unloading station and likewise releasing the brake and lock, of a pulley located above said platform, a cable suspended from said pulley having its ends connected with the crossbar of said T-lever, and means connected with and adapted to manually operate said pulley and actuate the cable suspended therefrom, causing the T-shaped lever to actuate the arm for simultaneously operating the friction brake and the lock.

4. The combination with elevator platforms, the suspending cable therefor, alternately operating drums for operating said cable and a continuously revolving driveshaft therefor, a friction brake and a positive locking device, an oscillating shaft connected with and adapted to simultaneously operate said brake and locking device, an arm projecting from said shaft, provided about midway of its length with a curved depression, a T-shaped lever supported by said arm, a depending roller adapted to be moved by said arm to occupy said depression, of a friction clutch upon the driveshaft for each drum, a neutral member therefor, adapted to alternately engage and operate said friction members, a lever connected with said friction clutch at one end and pivoted at its other end to the stem of the T-shaped lever whereby the roller depending from the T-shaped lever occupies the depression in the arm, the friction clutch is in neutral, the brake set and the elevator is positively locked at its landing station until the roller is shifted from said depression.

5. In a hoisting machine, the combination with a pair of drums, of means for alternately effecting a power drive to said drums including a shiftable clutch, means for braking said drums comprising yieldingly applied members, a transverse oscillatable lever, connections between said clutch and lever and between said brakes and lever for simultaneously shifting said clutch and operating said brakes, and a remote control connected to opposite ends of said lever.

6. The combination with a plurality of elevator platforms, of suspensory means therefor, a hoisting machine, drums on said hoisting machine for sustaining said means, mechanism for alternately driving a pair of said drums, including a slidably mounted clutch, braking mechanism for said drums, an oscillatable lever, a remote control for said lever, mechanism actuated by said lever for simultaneously releasing said braking mechanism and shifting said clutch for effecting a drive through one of said drums and means on said control actuated by said elevator platforms for shifting said clutch to neutral position and allowing said braking mechanism to be applied.

7. The combination with a hoisting tower, of a pair of elevator platforms supported for vertical slidable movements in said tower, means for supporting said platforms including a cable, a pair of drums for operating said cable, mechanism for alternately driving said drums including a shiftable clutch, a pair of brakes for stopping the rotation of said drums, a shaft connected to said brakes, a transverse oscillatable lever, means on said tower for operating said lever and means operated simultaneously by said lever for releasing said brakes and shifting said clutch for effecting a drive through one of said drums.

8. In a hoisting apparatus, a hoisting tower, a pair of simultaneously oppositely movable elevators in said tower, means including a cable and a hoisting machine for operating said elevators, a pulley at the top of said tower, a cable trained over said pulley, an oscillatable lever connected at spaced points to said second cable, means operated by said lever for controlling the hoisting machine, and a stop member on each reach of the second mentioned cable, said elevators having abutments in the path of said stops.

9. In a hoisting apparatus, a hoisting tower, a pair of elevator platforms supported in said tower, a hoisting machine embodying a plurality of drums, a cable connecting said elevators and drums, driving mechanism for a pair of said drums including clutching means for alternately connecting said pair of drums to said driving mechanisms, a pair of brakes for stopping said drums, an oscillatable lever, a pair of connections simultaneously operated by said lever for controlling said brakes and clutching means, cable members having their ends connected to said lever, stops on said cable members, abutments on said elevator platforms in the path of said stops for automatically operating said cable members and manually operated means for also operating said cable members.

10. In a hoisting machine, a pair of drums, driving mechanism for the drums including spaced clutch members and an intermediate clutch device adapted for alternate engagement with said clutch members, spring applied brakes for controlling the rotation of said drums, a shaft having a connection with said brakes, an oscillatable lever, a cam arm operated by said lever, a connection between said cam arm and brake shaft, a connection between said intermediate clutch member and lever, a pair of elevator platforms controlled by said drums, and means operated by said platforms for shifting said lever to disconnect the engaged clutch and apply said brakes and remote manually operated means for shifting said lever for releasing said brakes and effecting engagement of one of said clutches.

11. In a hoisting apparatus, the combination with elevator platforms, a suspensory cable therefor, drums for actuating said cable, a drive shaft geared to said drums, friction brakes upon said drive shaft, spring means for applying said brakes and means at the unloading station for releasing said brakes.

12. In a hoisting apparatus, a pair of hoisting drums, driving mechanism for said drums, a shiftable device for alternately connecting said drums to said driving mechanism, a pair of brakes for braking the action of said drums, an oscillatable lever, a cam member operated by said lever and connected to said brakes, a yoke lever connecting said shiftable device to said oscillatable lever, elevator platforms controlled by said drums, means operated by said platforms for shifting said oscillatable lever and remote manually controlled means for also shifting said oscillatable lever.

13. In a hoisting apparatus, a pair of hoisting drums, driving mechanism therefor including a clutch member associated with each drum, a shiftable clutch member for alternate engagement with said clutch members, friction brakes for said drums, a brake shaft connected to said brakes, an oscillatable lever pivoted intermediate its ends, a yoke lever connecting said shiftable clutch member and oscillatable lever, a cam arm in the path of said oscillatable lever, means connecting said cam arm and brake shaft, and means connected to the ends of said oscillatable lever and operable at a remote point for controlling said brakes and shiftable clutch member.

14. In a hoisting apparatus, a hoisting tower, elevators guided in said tower, a pair of operated drums, a guide drum, a one piece cable connecting said elevators and drums, driving mechanism for the operated drums including a clutch mechanism for alternately connecting said drums in driving relation with said mechanism, a pair of resiliently applied brakes for said drums, a brake shaft connected to said brakes, and mechanism including a control cable actuated at a remote point for simultaneously controlling said clutch mechanism and brakes.

15. In a hoisting apparatus, a hoisting tower, elevator platforms guided in said tower, a hoisting machine comprising a pair of loosely supported drums, driving mechanism for said drums including a shiftable clutch member for alternately establishing a drive relation through said drum, a cable connecting said platforms with said drums, a guide drum for said cable, resiliently applied friction brakes for stopping said drums, a transverse lever, means operated by said lever for simultaneously shifting said clutch member and operating said brakes, and a remote control for said lever automatically operated by said platforms for shifting the same for controlling said clutch member and brakes.

16. In a hoisting machine, a pair of loosely mounted drums, a gear associated with each drum, a drive shaft, a pair of pinions loosely mounted upon said drive shaft and in mesh with said gears, the hubs of said pinion embodying each a clutch member, a shiftable clutch device between said pinions, for alternately engaging the same with said drive shaft, a brake band surrounding each clutch member, a shaft connected to said brake bands, a transverse lever pivoted intermediate its ends, a cable, connected to each end of said lever for operating the same, a cam arm operated by said lever, a connection between said arm and brake shaft and a connection between said clutch device and transverse lever.

17. In a hoisting apparatus, a hoisting tower, elevator platforms guided in said tower, means for simultaneously raising one platform and lowering the other comprising a pair of loosely mounted drums, driving mechanisms for said drums including a clutch operable for establishing a drive through one of said drums, a friction brake for controlling the rotation of each drum, a transverse lever, a remote control connected to the ends of said lever and mechanism operated by said lever for simultaneously controlling said clutch and brakes.

18. In a hoisting apparatus, a hoisting tower, a pair of elevator platforms guided in said tower, means for operating said platforms in opposite directions comprising a pair of loosely mounted drums, driving mechanism for said drums including a shiftable clutch element for alternately establishing a drive through the same, a pair of friction brakes for stopping said drums, a transverse lever, means operated by said lever for controlling said brakes and shiftable clutch element, and means attached to the ends of said lever adapted to be automatically operated by said elevators and manually operated at the top of the tower.

19. In a hoisting apparatus, a hoisting tower, elevator platforms guided in said tower, means for raising and lowering said platforms comprising a hoisting machine embodying a shiftable clutch member and a pair of brakes, a transverse lever pivoted intermediate its ends to said machine, means operated by the shifting of said lever for operating said clutch member and brakes, cable members attached to the ends of said lever and extending to the top of the tower, manually operated means located at the top of the tower and connected to said cable members, and stop devices on said cable members for coaction with said elevator platforms.

20. In a hoisting apparatus, a pair of elevator platforms, a pair of operated drums, a guide drum, a cable connecting said platforms and drums, driving mechanism for the operated drums embodying shiftable means for alternately driving said drums, said shiftable means having a neutral position and two operative positions, friction brakes for stopping said drums, and a control automatically actuated by said platforms for shifting said means to neutral position and allowing said brakes to be applied and manually actuated means connected to said control for shifting said shiftable means into one of its operative positions and releasing said brakes.

21. The combination with elevator platforms, a suspensory cable therefor, drums for actuating said cable, mechanism for alternately operating said drums, friction brakes for controlling said drums, a lever pivoted intermediate its ends, brake operating mechanism controlled by said lever, a cable member connected to each end of said lever, and a stop on each cable member lying in the path of an elevator platform.

22. In a hoisting apparatus including a tower having an upper unloading station, oppositely movable elevator platforms guided in said tower, a hoisting machine for operating said elevator platforms including a pair of drums, and a cable connecting said platforms and drums, said machine embodying starting and stopping mechanism for said drums, a lever pivoted intermediate its ends, means operated by said lever for controlling said starting and stopping means, a connection extending from each end of said lever to said unloading station, said platforms automatically actuating said connections for stopping said drums and manually operated means for actuating said connections for starting said machine.

23. In a hoisting apparatus including a tower having an upper unloading station, oppositely movable elevator platforms guided in said tower, operating mechanism for said platforms comprising a guide drum, a pair of driven drums, said operating mechanism comprising a shiftable clutch element, resiliently applied brakes for controlling said drum, a lever pivoted intermediate its ends, a clutch shifting member connected to said lever, operating mechanism for said brakes including an arm actuated by said lever, a cable member extending from each end of said lever, and means at the unloading platform for actuating said cable members.

24. In a hoisting apparatus, the combination with elevator platforms, a suspensory cable therefor, drums for actuating said cable, mechanism for alternately driving said drums, friction brakes for said drums, resilient means for applying said brakes and means at the unloading station for releasing said brakes.

25. In a hoisting apparatus, the combination with elevator platforms, a suspensory cable therefor, drums for actuating said cable, driving mechanism for said drums, friction brakes for controlling said drums, a control for said brakes automatically actuated by said elevator platforms for setting said brakes and manually operated means connected to said control for releasing said brakes.

In witness whereof, I have hereunto set my hand this 12th day of December, 1924.

EDWIN A. ALLEN.